Aug. 28, 1962     H. HÜGEL     3,051,004
PRESSURE METERS FOR DRILL BORES AND THE LIKE
Filed June 24, 1958
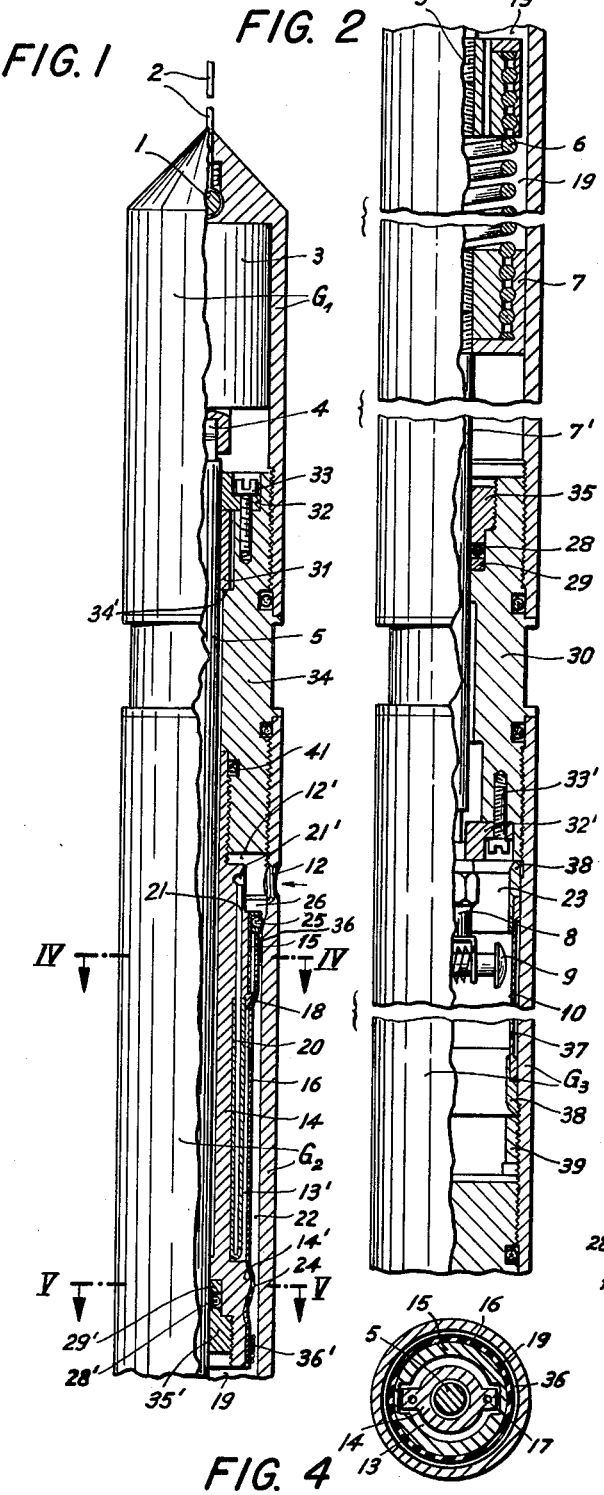
INVENTOR.
HELMUT HÜGEL
BY
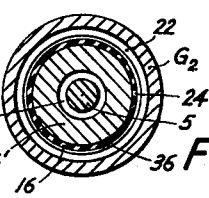
ATTORNEY 3,051,004
PRESSURE METERS FOR DRILL BORES
AND THE LIKE
Helmut Hügel, Salvador-Bahia, Brazil, assignor to Firma Gutehoffnungshutte Sterkrade Aktiengesellschaft, Oberhausen, Rhineland, Germany
Filed June 24, 1958, Ser. No. 744,092
Claims priority, application Germany June 26, 1957
12 Claims. (Cl. 73—395)

The present invention relates to pressure meters or gauges in general, and more particularly to devices for measuring and recording the pressure of a liquid, especially in drill bores and the like.

The recording of pressures at various depths and at the lowermost point of a drill bore is an important expedient for proper planning and optimum exploitation of mineral oil deposits. It is already known to utilize certain types of manographs, i.e. devices capable of graphically recording the pressures existing in drill bores, such manographs being required to record the pressures with very great accuracy and in a most reliable way. Since the drill bore must be closed while the pressures of liquid substances therein are being measured, the recording should be quite accurate as a repeated test caused by faulty recording entails undesirable interruption of exploitation and attendant losses in the output of a well. The manographs of known construction do not meet such requirements.

For example, many known instruments will give rather unreliable measurements after a longer period of non-use. This is frequently caused by faulty packing glands or other sealing devices which are necessary component parts of such measuring instruments. Furthermore, any impurities entering into and accumulating in the device affect the accuracy of recording and, if not frequently and thoroughly removed, may even render the device inoperative. The cleaning of existing manographs is a lengthy procedure which often necessitates partial or complete disassembling and overhauling of the device. Still further, manographs of known construction are unreliable when put to use under greatly varying temperature conditions which often arise in drill bores.

An important object of the present invention is to provide an instrument for measuring of liquid pressures which is capable of being put to use under greatly differing operating conditions.

A more specific object of the invention is to provide a manograph designed for use in drill bores so constructed as to automatically adjust the presssure recording mechanism under greatly varying temperature conditions and in cases of changes in the volumetric contents of pressure conveying fluid in the instrument.

Another object of the invention is to provide a device of the above described characteristics which is constructed with a view to facilitate removal of impurities without requiring disassembly of component parts.

An additional object of the invention is to provide a manograph particularly suited for measuring the pressure of liquids in drill bores, which embodies simple and efficient means for collecting impurities which enter the instrument.

A further object of the invention is to provide a pressure measuring and recording device embodying means for recording the temperatures prevailing at different depths of a drill bore.

A still further object of the instant invention is to provide a device for measuring the pressure of liquids which is relatively simple in construction, reliable and accurate in operation, and which may be readily taken apart for inspection or replacement of parts.

A yet further object of the invention is to provide improved sealing means for use in the novel device in order to prevent leakage of the mineral oil into certain sections of the instrument.

The above objects of the invention are attained by the provision of a gauge comprising an elongated housing, preferably consisting of several sections which are joined substantially end-to-end, the housing being suspended from a wire or a drill pole to be received in a drill bore so that the liquid substance, e.g. mineral oil, is free to enter through one or more inlet orifices into the interior of housing and causes the recording device to graphically represent its pressure at a certain depth in the drill bore.

The system for receiving and conveying pressures to the recording device comprises a tubular diaphragm one side of which is exposed to the liquid substance entering the housing from a drill bore while its other side conveys the pressure of liquid to the recording mechanism by means of a fluid medium acting against a spring-biased plunger which is connected with the stylus of the recording device. The diaphragm is mounted between a stationary and an axially slidable carrier in such a way as to permit, under certain pressure conditions, the overflow of liquid substances into the area normally occupied by the pressure conveying fluid, or to permit escape of normally entrapped fluid from the instrument. Thus, in conjunction with certain other component parts of my instrument, the diaphragm acts as a two-way safety valve equalizing the pressures of liquid and fluid which act against its sides to thus insure accuracy of recordings made by the manograph.

Means are provided for collecting and/or removing any impurities introduced by the liquid substance into the novel device. Such means consist of a sieve-like pipe located at that side of diaphragm which is exposed to the inflowing liquid the perforated pipe communicating with the inlet orifice in such a way as to rapidly expel the impurities upon introduction of a cleaning fluid therethrough.

Sealing means, preferably cord packings, are installed at points of greatest liquid or fluid pressure, together with relatively harder packings to prevent squeezing of cord into the annular spaces between relatively rotating parts and eventual interruption of angular movement. The recording device is connected, through suitable spindle and coupling means, the aforementioned plunger means, and an interposed resilient device, with a rotary-motion-imparting device, for example, a clockwork mechanism, an electrical drive or the like, so as to be rotated at a constant angular speed while the plunger, which is constantly urged by the resilient element into a position of rest, causes deflections of the recording stylus proportional with the variations in pressure of liquid material entering from the drill bore.

The elongated, tubular and preferably elastic diaphragm is mounted between a stationary carrier which is installed in the proximity of the inlet orifice, and an axially slidable ring carrier which latter is immediately adjacent to said orifice. The ring, acting as a piston under the influence of pressure conveying fluid which fills the interior of certain sections of the manograph and acts against the plunger, under certain circumstances often brought about by very high temperatures which cause the fluid to expand, slides in the direction toward the inlet orifice and permits escape of a certain quantity of fluid from the instrument. The diaphragm is so connected with the stationary carrier that it may permit overflow of a certain quantity of introduced liquid substance into the space normally occupied by the pressure conveying fluid, the overflow occurring through an aperture in the diaphragm which is normally sealed by the stationary carrier but becomes exposed when the diameter of the diaphragm increases, i.e. when the pressure transmitting fluid does not sufficiently fill the space adjacent to the other side of the diaphragm.

Additional recording means, such as a thermometer, may be installed in the improved instrument, preferably at its lower end. The rotation imparting mechanism preferably occupies a space adjacent to the upper end of the manograph.

The resilient element may be a compression spring or a tension spring, its function being to maintain the plunger and the pressure recording mechanism in a certain neutral position whenever the pressure of liquid substance and hence of the pressure conveying fluid ceases.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

FIG. 1 is half sectional and half elevational view of the upper portion of my improved gauge;

FIG. 2 is a similar view of the median portion;

FIG. 3 is elevational view of the lower end portion of the gauge; and

FIGS. 4 and 5 are transverse sections taken, respectively, on lines IV—IV and V—V of FIG. 1, as seen in the direction of arrows.

Referring now in greater detail to the drawings, the upper end of the gauge, shown in FIG. 1, is suspended from a wire 2 whose lower terminal is connected to anchoring means 1. Wire 2 may be replaced by other suitable suspending devices by means of which the gauge may be introduced into a drill bore, for example, by drill poles or the like.

The gauge is of elongate cylindrical form and consists of tubular sections $G_1$, $G_2$, $G_3$ and $G_4$, sections $G_1$ and $G_2$ being connected by a nipple 34, sections $G_2$ and $G_3$ by a similar connecting element 30, and sections $G_3$ and $G_4$ by element 40, respectively. Elements 34, 30 and 40, in addition to connecting the sections, perform certain other functions which will be fully explained as this description proceeds.

Within and at the upper end of section $G_1$, there is installed a clockwork mechanism 3 which is shown only schematically as it may be of any known design, its construction forming no part of my invention. It is assumed here that the clockwork mechanism is driven by a spring, but it will be understood that it may be replaced by an electrically operated device or other rotary motion imparting means. Mechanism 3 drives a coaxially disposed spindle 5 over the coupling means 4, the spindle being connected to the upper end of a coil spring 6. The lower end of said spring is embedded in a plunger 7 whose rod 7' is connected to a holder 8 for the recording means 9 having the shape of a stylus, the pointed end of member 9 being in contact with a cylindrical foil 10 of aluminum or other suitable material adjacent to a portion of inner cylindrical surface of the gauge section $G_3$. Member 9 plots on the foil 10 a pressure-time diagram in a manner to be described hereinafter.

Sections $G_2$ and $G_3$ may be of considerable length, which is indicated by break lines in FIG. 2.

Bottom section $G_4$ preferably receives a thermometer 11 which is schematically shown in phantom lines. The thermometer may be inserted upon unscrewing the section $G_4$ from connecting nipple 40.

When the gauge is installed in a drill bore, the liquid substance whose pressure requires determination and recording enters through inlet orifice 12 in section $G_2$ and fills annular enclosures 12', 26 and 13, the latter of which is shown in FIG. 4. Enclosure 13 is formed between an axially slidable ring 15 and the periphery of an elongate carrier 14 whose upper end is threaded to be received in the tapped bore within the lower end of connecting element 34. The liquid substance which is under a certain pressure flows downwardly into the enclosure 13' within a tubular diaphragm 16 which is under axial tension. The upper end of member 16 is connected to ring 15, its lower end being fixed to an enlarged collar or boss 14' forming part of carrier 14. Rotation of ring 15 with respect to stationary carrier 14 is prevented by a tongue-and-groove connection 17, shown in FIG. 4, which restricts the ring 15 to axial movements in gauge section $G_2$. A projecting nose 18, forming part of carrier 14, limits the extent of downward displacements of ring 15. In addition to limiting member 15 in its axial movements, projection 18 facilitates the insertion of assembly 14—16 into the gauge section $G_2$.

Any impurities entering with the liquid substance through inlet orifice 12 and into enclosure 13' between carrier 14 and diaphragm 16 may be removed through a sieve-like tube 20 having a perforated cylindrical wall whose upper end is connected with carrier 14 adjacent to the diaphragm-supporting ring 15 and communicates with channels 21, 21' in that order, the latter opening into the annular chamber 12' adjacent to inlet orifice 12. Thus, when the instrument is removed from a drill bore, a cleaning fluid, e.g. gasoline, is introduced into the channel 21' with the help of a cannula or the like passing loosely through the orifice 12, the fluid being under sufficient pressure to expel the impurities through the interstices of the sieve-like member 20 through the enclosures 13', 13, 12' and outwardly through the orifice 12 in that order.

During the gauging and recording operation, pressure of a liquid substance flowing into enclosure 13' is conveyed by yieldable membrane 16 to a pressure transmitting fluid, e.g. oil (not shown), which fills the annular enclosure 22 between section $G_2$ and the periphery of diaphragm 16. This pressure transmitting fluid also fills the chamber 19 in which the resilient element 6 is installed. As shown in FIG. 1, chamber 19 communicates with enclosure 22, the latter forming the upper part of said chamber. The pressure of liquid substance in enclosure 13', through the diaphragm 16 and the fluid in chamber 19, is conveyed to plunger 7 which is displaced in downward direction and moves its rod 7' against the contracting force of resilient element 6. Rod 7' displaces the holder 8 in registering chamber 23 together with stylus 9, and the latter travels along the recording foil 10 to describe a certain curve whose deflection is proportional with the pressure of liquid substance entering the gauge through orifice 12. Clockwork mechanism 3, through coupling 4, spindle 5, spring 6, plunger 7, rod 7' and holder 8, continuously rotates the stylus 9.

In the event that, for some reason, there is not enough pressure transmitting fluid in spring chamber 19, tubular diaphragm 16 increases its diameter due to the pressure of liquid substance which fills its interior, i.e. the enclosure 13'. By increasing its diameter, the radially expanding diaphragm 16 permits escape of liquid from enclosure 13' about the upper portion of enlarged zone 14' and through a discharge aperture 24 into the annular space 22. In this manner, pressure equalization takes place at both sides of the diaphragm 16.

When, on the other hand, the pressure transmitting fluid expands at increasing temperatures and its pressure increases with respect to the pressure of liquid substance in enclosure 13', fluid from enclosure 22 may enter into the enlarged annular space 26 above the ring 15 because the latter, by piston action, moves in upward direction under the influence of fluid pressure in chamber 22 and opens a narrow annular slot for the passage of fluid into the enclosure 26. It will be noted in FIG. 1 that the upper portion of slidable carrier 15 which surrounds the sealing ring 25 has a sliding fit with the housing section $G_1$. The lower portion of member 15, to which the upper end of diaphragm 16 is connected, is of reduced diameter so that the fluid filling the enclosure 22 may act against the upper portion of and axially expand the diaphragm sufficiently to permit escape of fluid into space 26 and thence through the orifice. Sealing ring 25 normally, i.e. when the pressure of fluid in chamber 22 does not increase to an undesirable extent, closes the passage for fluid about the annular member 15. In this manner, diaphragm 16, boss 14' and aperture 24 on the one hand, and diaphragm 16, annular ring 15 and sealing element 25 on the other hand, act as two one-way safety valves against excessive or underpressure of the pressure transmitting fluid as compared with the pressure of liquid substance in the sampling bore.

Entry of fluid, preferably oil, from chamber 19 into the chamber 23 is prevented by an annular sealing member 28, preferably cord packing, retained in connecting nipple 30 about the plunger rod 7' by means of a hollow screw 35. A similar screw 35' retains another sealing element 28' in the recess communicating with the tapped bore at the lower end of stationary member 14 to prevent passage of fluid from annular chamber 22 into the interior of hollow carrier 14. At the lower-pressure side of respective sealing elements or cord packings 28, 28', there are provided relatively hard, spirally slotted plastic rings 29, 29', respectively, made e.g. of Teflon (trademark). These relatively hard members 29, 29' prevent, at very high pressures, the squeezing of sealing rings 28, 28' into the annular slots between the rod 7' and connecting nipple 30 on the one hand, and between the carrier 14 and spindle 5 on the other hand. Axial displacements of spindle 5 with respect to carrier 14 and nipple 34 are prevented by the provision of an annular collar 31 which is fixed to the spindle by means of a non-represented pin or the like. The lower end face of collar 31 abuts against a shoulder 34' in the axial bore of connecting member 34, its upper end face abutting against a gland 32 which is fixed to nipple 34 by means of one or more screws 33. A similar member 32' is fixed to the lower end of nipple 30 by means of one or more screws 33', as is shown in FIG. 2. Collar 31 is free to rotate in member 34.

A cord packing 41 at the reduced upper end of carrier 14 prevents entry of liquid substance into the space between nipple 34 and spindle 5. It will further be noted that similar packing elements are provided between each nipple and the respective gauge sections to seal the device against entry of liquid at any point with the exception of orifice or orifices 12.

The upper end of diaphragm 16 is secured to the periphery of axially slidable ring 15 by means of a convoluted cord 36, as is best shown in FIG. 4, and a similarly convoluted cord 36' fastens the lower end of tubular diaphragm 16 to the lower end of boss 14' beneath the discharge aperture 24 in said diaphragm (see FIGS. 1 and 5).

Recording foil 10 is installed in a cylinder 37 and may be inserted into or removed from section $G_3$ together with said cylinder. Cylinder 37 is mounted in section $G_3$ by means of clamping rings 38, 38', the former abutting against a hollow screw 39.

The novel gauge is capable of a number of further modifications in addition to those already mentioned hereinbefore. For example, the compression spring 6 may be replaced by a tension spring with relatively small modifications of the illustrated instrument, and the number of inlet orifices may be increased, if desired. It will also be clear that the novel device is not necessarily limited to gauging of liquid pressures in drill holes but can find application wherever and whenever the pressure of a liquid substance must be determined. Still further, the manograph may operate with a single safety valve. Thus, the annular ring 15 may be fixed to housing section $G_1$ which will permit only the liquid substance to overflow through the aperture 24 whereas the fluid in enclosure 22 will be unable to escape through the orifice 12. On the other hand, aperture 24 in the diaphragm may be omitted which will prevent communication of a liquid between the enclosures 13' and 22.

What is claimed as new and desired to be secured by Letters Patent is:

1. Apparatus for measuring and recording the pressure of a liquid which comprises, in combination: elongate housing means having an axis, an upper end and at least one inlet orifice spaced from said upper end; stationary carrier means in said housing means disposed adjacent to and extending beneath said orifice, said carrier means having an enlarged lower end; second carrier means in said housing means slidable in the direction of said axis, said slidable carrier means disposed adjacent to and normally beneath said orifice and surrounding a portion of said stationary carrier means at a point above said lower end thereof; plunger means disposed for rotational and axial movements in said housing means beneath said carrier means; resilient means for constantly urging said plunger means in upward direction in said housing means; recording means comprising a cylindrical member in and fixed to said housing means beneath said plunger means, and stylus means fixed to said plunger means for rotational and axial movements therewith, said stylus means extending into said cylindrical member; means installed within and adjacent to the upper end of said housing means and operatively connected with said plunger means for rotating the same at a constant speed together with said stylus means; an elastic tubular diaphragm having an upper end connected to said slidable carrier means, a lower end connected to the lower end of said stationary carrier means, and having an aperture adjacent to said lower end thereof normally closed by the lower end of said stationary carrier means, the portion of said diaphragm between said upper and lower ends thereof being spaced from the housing means and from the stationary carrier means whereby said diaphragm and said stationary carrier means define therebetween a first enclosure communicating with said orifice through channel means formed between said first named and said second carrier means, and said diaphragm and said housing means define a second enclosure normally sealed from said first enclosure; annular means provided on and disposed about said slidable carrier means, said annular means normally sealingly engaging said housing means to seal said second enclosure from said orifice; and a pressure transmitting fluid filling said second enclosure and the space therebeneath between said stationary carrier means and said plunger means, said apparatus operating in such manner that a liquid entering through said inlet orifice fills said first enclosure and through said diaphragm conveys its pressure to said pressure transmitting fluid and to said plunger means which latter is axially displaced against the force of said resilient means whereby said stylus means records the pressure on said cylindrical member, that a predetermined pressure of the liquid in said first enclosure causes said diaphragm to increase its diameter and to move its aperture away from the lower end of said stationary carrier means whereby the liquid is free to overflow into said second enclosure, and that a predetermined pressure of said pressure transmitting fluid causes said diaphragm to expand in the axial direction of said housing means to produce axial movement of said slidable carrier means to a position in which said annular means is out of sealing engagement with said housing means whereby said annular means and said housing means define a passage in communication with said orifice and with said second enclosure to permit escape of pressure transmitting fluid through said orifice.

2. Apparatus for measuring and recording the pressure of a liquid which comprises, in combination: elongate housing means having an axis, an upper end and an inlet orifice spaced from said upper end; stationary carrier means in said housing means disposed adjacent to and extending beneath said orifice, said carrier means having an enlarged lower end; second carrier means in said housing means slidable in the direction of said axis, said slidable carrier means disposed adjacent to and normally beneath said orifice and surrounding a portion of said stationary carrier means at a point above said lower end thereof, said slidable carrier means comprising an upper portion having a sliding fit and normally sealingly engaging with said housing means and a lower portion of reduced diameter; plunger means disposed for rotational and axial movements in said housing means beneath said carrier means; resilient means for constantly urging said plunger means in upward direction in said housing means; recording means comprising a hollow cylindrical member in and fixed to said housing means beneath said plunger means, and stylus means fixed to said plunger means for rotational and axial movements therewith, said stylus means extending into said cylindrical member; means installed within and adjacent to the upper end of said housing means and operatively connected with said plunger means for rotating the same at a constant speed together with said resilient means and said stylus means; an elastic tubular diaphragm having an upper end connected to the lower portion of said slidable carrier means and a lower end connected to the lower end of said stationary carrier means, the portion of said diaphragm between said upper and lower ends thereof being spaced from said housing means and from said stationary carrier means whereby said diaphragm and said stationary carrier means define therebetween a first enclosure communicating with said orifice through channel means formed between said first named and said second carrier means, and said diaphragm and said housing means define a second enclosure normally sealed from said orifice by the upper portion of said slidable carrier means; and a pressure transmitting fluid filling said second enclosure and the space therebeneath between said stationary carrier means and said plunger means, said apparatus operating in such manner that a liquid entering through said inlet orifice fills said first enclosure and through said diaphragm conveys its pressure to said fluid and said plunger means which latter is axially displaced against the force of said resilient means whereby said stylus means records the pressure on said cylindrical member, and that a predetermined pressure of said fluid causes said diaphragm to expand in the axial direction of said housing means to produce axial movement of said slidable carrier means to a position in which the upper portion of said slidable carrier means is out of sealing engagement with said housing means whereby the upper portion of said slidable carrier means and said housing means define a passage in communication with said orifice and with said second enclosure to permit escape of fluid through said orifice.

3. Apparatus for measuring and recording the pressure of a liquid which comprises, in combination: elongate housing means having an axis, an upper end and an inlet orifice spaced from said upper end; stationary carrier means in said housing means disposed adjacent to and extending beneath said orifice, said carrier means having an enlarged lower end; second carrier means of annular shape located adjacent to and beneath said orifice and surrounding a portion of said stationary carrier means; plunger means disposed for rotational movements in said housing means said plunger means located beneath said carrier means and slidable in the direction of said axis; resilient means for constantly urging said plunger means in upward direction; recording means comprising a hollow cylindrical member in and fixed to said housing means beneath said plunger means, and stylus means fixed to said plunger means for rotational and axial movements therewith, said stylus means extending into said cylindrical member; means installed within and adjacent to the upper end of said housing means and operatively connected with said plunger means for rotating same at a constant speed together with said stylus means; an elastic tubular diaphragm having an upper end connected to said second carrier means, a lower end connected to the lower end of said stationary carrier means, and having an aperture adjacent to said lower end thereof with said aperture normally sealed by the lower end of said stationary carrier means, the portion of said diaphragm between said upper and lower ends thereof being spaced from said housing means and from said stationary carrier means whereby said diaphragm and said stationary carrier means define therebetween a first enclosure communicating with said orifice through channel means formed between said first named and said second carrier means, and said diaphragm and said housing means define a second enclosure sealed from said orifice and normally sealed from said first enclosure; annular means provided on and disposed about said slidable carrier means, said annular means normally sealingly engaging said housing means to seal said second enclosure from said orifice; and a pressure transmitting fluid filling said second enclosure and the space therebeneath between said stationary carrier means and said plunger means, said apparatus operating in such manner that a liquid entering through said orifice fills said first enclosure and through said diaphragm conveys its pressure to said fluid and to said plunger means to axially displace the latter against the force of said resilient means whereby said stylus means records the liquid pressure on said cylindrical member, and that a predetermined liquid pressure in said first enclosure causes the diaphragm to increase its diameter and to move its aperture away from the lower end of said stationary carrier means whereby the liquid is free to overflow into said second enclosure.

4. Apparatus for measuring and recording the pressure of a liquid which comprises, in combination: elongate housing means having an axis, an upper end and at least one inlet orifice spaced from said upper end; stationary carrier means in said housing means disposed adjacent to and extending beneath said orifice; second carrier means slidable in and in the direction of the axis of said housing means, said slidable carrier means disposed adjacent to and beneath said orifice and surrounding a portion of said stationary carrier means; elastic tubular diaphragm means having an upper end connected to said slidable carrier means and a lower end connected to said stationary carrier means, the portion of said diaphragm means between the upper and lower ends thereof being spaced from said stationary carrier means and from said housing means whereby said diaphragm means and said stationary carrier means define therebetween a first enclosure in communication with said inlet orifice through channel means formed between said first named and said second carrier means, and said diaphragm and said housing means define a second enclosure; annular means provided on and disposed about said slidable carrier means, said annular means normally sealingly engaging said housing means to seal said second enclosure from said orifice; plunger means rotatably and axially displaceably received in said housing means beneath said carrier means; resilient means for constantly urging said plunger means in one direction; a pressure transmitting fluid filling said second enclosure and the area in said housing between said second enclosure and said plunger means; recording means comprising a cylindrical member in and fixed to said housing means beneath said plunger means, and stylus means fixed to said plunger means for rotational and axial displacements therewith, said stylus means having a point in contact with said cylindrical member; and means installed in said housing means and operatively connected with said plunger means for rotating same at a constant speed, said apparatus operating in such manner that a liquid entering through said orifice and filling said first enclosure subjects the pressure transmitting fluid in said second enclosure to a pressure which is conveyed to said plunger means in a direction opposed to the force of said resilient means whereby the latter describes an axial movement together with said stylus means, said stylus means recording the pressure on said cylindrical member, said second carrier means movable upwardly in response to a predetermined pressure of said pressure transmitting fluid and to resultant axial expansion of said diaphragm to move said annular means out of sealing engagement with said housing means whereby said housing means and said annular means define a passage between said second enclosure and said orifice to permit controlled escape of said fluid from said second enclosure through said orifice.

5. Apparatus for measuring and recording the pressure of a liquid which comprises, in combination: elongate housing means having an axis, an upper end and at least one inlet orifice spaced from said upper end; stationary carrier means in said housing means disposed adjacent to and extending beneath said orifice, said carrier means having an upper end sealingly fixed to said housing means above said orifice, a lower end spaced from said housing means, and having an axial bore; second carrier means slidable in and in the direction of the axis of said housing means, said slidable carrier means disposed adjacent to and beneath said orifice and surrounding a portion of said stationary carrier means; elastic tubular diaphragm means having an upper end connected to said slidable carrier means and a lower end connected to the lower end of said stationary carrier means, the portion of said diaphragm means between the upper and lower ends thereof being spaced from the housing means and from the stationary carrier means whereby said diaphragm means and said stationary carrier means define therebetween a first enclosure in communication with said inlet orifice through channel means formed between said first named and said second carrier means, and said diaphragm and said housing define a second enclosure; annular means provided on and disposed about said slidable carrier means, said annular means normally sealingly engaging said housing means to seal said second enclosure from said orifice; plunger means rotatably and axially displaceably received in said housing means beneath said carrier means; resilient means for constantly urging said plunger means in one direction, said resilient means having an upper end and a lower end with the latter rigidly connected to said plunger means; a pressure transmitting fluid filling said second enclosure and the area in said housing between said second enclosure and said plunger means; recording means comprising a hollow cylindrical member in and fixed to said housing means beneath said plunger means, and stylus means extending into and having a point in contact with said cylindrical member; and means for rotating said plunger means and said stylus means comprising a rotary motion imparting mechanism in and adjacent to the upper end of said housing means, a spindle operatively connected to said mechanism, extending through the bore in said stationary carrier means and rigidly connected with the upper end of said resilient means, and a rigid connection between said plunger means and said stylus means, said apparatus operating in such manner that a liquid entering through said orifice and filling said first enclosure subjects the pressure transmitting fluid in said second enclosure to a pressure which is conveyed to said plunger means in a direction opposed to the force of said resilient means whereby the latter describes an axial movement together with said stylus means, said stylus means recording the pressure on said cylindrical member while said mechanism continuously rotates said stylus means, said second carrier means movable upwardly in response to a predetermined pressure of said pressure transmitting fluid and to resultant axial expansion of said diaphragm to move said annular means out of sealing engagement with said housing means whereby said housing means and said annular means define a passage between said second enclosure and said orifice to permit controlled escape of said fluid from said second enclosure through said orifice.

6. Apparatus for measuring and recording the pressure of a liquid which comprises, in combination: elongate housing means having an axis, an upper end and at least one inlet orifice spaced from said upper end stationary carrier means in said housing means disposed adjacent to and extending beneath said orifice; second carrier means slidable in and in the direction of the axis of said housing means, said slidable carrier means disposed adjacent to and beneath said orifice and surrounding a portion of said stationary carrier means; expandible tubular diaphragm means having an upper end connected to said slidable carrier means and a lower end connected to said stationary carrier means, the portion of said diaphragm means between the upper and lower ends thereof being spaced from said housing means and from said stationary carrier means whereby said diaphragm means and said stationary carrier means define therebetween a first enclosure in communication with said inlet orifice through channel means formed between said first named and said second carrier means, and said diaphragm and said housing means define a second enclosure; annular means provided on and disposed about said slidable carrier means, said annular means normally sealingly engaging said housing means to seal said second enclosure from said orifice; a tubular element in said first enclosure, said tubular element having perforated walls, connected with said stationary carrier means and communicating with said orifice; plunger means rotatably and axially displaceably received in said housing means beneath said carrier means; resilient means for constantly urging said plunger means in one direction; a pressure transmitting fluid filling said second enclosure and the area in said housing between said second enclosure and said plunger means; recording means comprising a cylindrical member in and fixed to said housing means beneath said plunger means, and stylus means fixed to said plunger means for rotational and axial displacements therewith, said stylus means having a point in contact with said cylindrical member; and means installed in said housing means and operatively connected with said plunger means for rotating same at a constant speed, said apparatus operating in such manner that a liquid entering through said orifice and filling said first enclosure subjects the pressure transmitting fluid in said second enclosure to a pressure which is conveyed to said plunger means in a direction opposed to the force of said resilient means whereby the latter describes an axial movement together with said stylus means, said stylus means recording the pressure on said cylindrical member, said second carrier means movable upwardly in response to a predetermined pressure of said pressure transmitting fluid and to resultant axial expansion of said diaphragm to move said annular means out of sealing engagement with said housing means whereby said housing means and said annular means define a passage between said second enclosure and said orifice to permit controlled escape of said fluid from said second enclosure through said orifice.

7. A gauge for measuring and recording the pressure of liquids comprising, in combination: an elongate cylindrical housing comprising a plurality of sections and having an upper end and an inlet orifice in one of said sections; connecting means for joining said sections in substantially end-to-end relationship; a carrier in said one section adjacent to and extending beneath said orifice, said carrier having an axial bore, an enlarged lower end and an upper end fixed to the adjacent connecting means; a ring surrounding a portion of said carrier adjacent to and below said orifice; annular means carried by and surrounding said ring in said one section, said annular means normally sealingly engaging with and axially movable in said one section; a spindle extending through the bore of said carrier, said spindle having an upper end extending toward the upper end of said housing and a lower end extending beneath said carrier; means connected to the upper end of said spindle for rotating the same at a constant speed; a plunger rotatably and axially slidably installed in said housing beneath said carrier; a spring having one end connected to the lower end of said spindle and another end connected to said plunger; a hollow cylinder in said housing beneath said plunger; a stylus rigidly connected with said plunger and extending into said cylinder, said stylus, said plunger, said spring and said spindle all rotating in unison and said plunger with said stylus being axially displaceable with respect to said spindle; an expandible tubular diaphragm having an upper end connected to said ring and a lower end connected to the lower end of said carrier, the portion of said diaphragm between the upper and lower ends thereof being spaced from said one section and from said carrier whereby said diaphragm and said carrier define therebetween a first chamber in communication with said orifice through channel means formed between said carrier and said ring, and said diaphragm and said one section define a second chamber normally sealed from said first chamber, said annular means normally sealing said second chamber from said orifice; and a pressure transmitting fluid filling said second chamber and a portion of the housing between said plunger and said carrier, said gauge operating in such manner that a liquid passing through said orifice and filling said first chamber transmits its pressure to said diaphragm and to the fluid in said second enclosure to displace the plunger against the force of said spring whereby said stylus records the pressure of liquid on said cylinder, said ring movable upwardly in response to predetermined pressure of said pressure transmitting fluid and to resultant axial expansion of said diaphragm to move said annular means out of sealing engagement with said one section and to provide a passage between said second chamber and said orifice for controlled escape of said fluid from said second chamber through said orifice.

8. A gauge for measuring and recording the pressure of liquids comprising, in combination: an elongate cylindrical housing comprising a plurality of sections and having an upper end and an inlet orifice in one of said sections; connecting means for joining said sections in substantially end-to-end relationship; a carrier in said one section adjacent to and extending beneath said orifice, said carrier having an axial bore, an enlarged lower end and an upper end fixed to the adjacent connecting means; a ring surrounding a portion of said carrier adjacent to and below said orifice; annular means carried by and surrounding said ring in said one section, said annular means normally sealingly engaging with and axially movable in said one section; a spindle extending through the bore of said carrier, said spindle having an upper end extending toward the upper end of said housing and a lower end extending beneath said carrier; means connected to the upper end of said spindle for rotating the same at a constant speed; a plunger rotatably and axially slidably installed in said housing beneath said carrier; a spring having one end connected to the lower end of said spindle and another end connected to said plunger; a hollow cylinder in said housing beneath said plunger; a stylus rigidly connected with said plunger and extending into said cylinder, said stylus, said plunger, said spring and said spindle all rotating in unison and said plunger with said stylus being axially displaceable with respect to said spindle; a tubular diaphragm of elastic material having an upper end connected to said ring, a lower end connected to the lower end of said carrier, and having an aperture adjacent to its lower end normally sealed by the lower end of said carrier, the portion of said diaphragm between said ring and the lower end of said carrier being spaced from said one section and from said carrier whereby said diaphragm and said carrier define therebetween a first chamber in communication with said orifice through channel means formed between said carrier and said ring, and said diaphragm and said one section define a second chamber normally sealed from said first chamber, said annular means normally sealing said orifice from said second chamber; and a pressure transmitting fluid filling said second chamber and a portion of the housing between said plunger and said carrier, said gauge operating in such manner that a liquid passing through said orifice and filling said first chamber conveys its pressure to said diaphragm and to the pressure transmitting fluid in said second enclosure to displace the plunger against the force of said spring whereby said stylus records the liquid pressure on said cylinder, and that a predetermined liquid pressure in said first chamber causes the diaphragm to expand and to move said aperture away from said carrier whereby the liquid is free to overflow into said second chamber, said ring movable upwardly in response to a predetermined pressure of said pressure transmitting fluid and to resultant axial expansion of said diaphragm to move said annular means out of sealing engagement with said one section and to define a passage between said second chamber and said orifice for controlled escape of said fluid from said second chamber.

9. A gauge for measuring and recording the pressure of liquids in a drill bore comprising, in combination; an elongate housing of cylindrical contour comprising a plurality of sections and having an axis, an upper end and an orifice spaced from said upper end; means for suspending the upper end of said housing whereby said housing may be introduced into a drill bore; a carrier in said housing adjacent to and extending beneath said orifice, said carrier having an upper end rigidly fixed to said housing, a lower end, and an axial bore; a ring surrounding a portion of said carrier and axially slidably received in said housing beneath said orifice, said ring having an upper portion and a lower portion of reduced diameter, said upper portion normally sealingly engaging with said housing; a spindle extending through the bore of said carrier, said spindle having an upper end and a lower end; means connected to the upper end of said spindle for rotating the same at a constant speed; a spring connected to the lower end of said spindle for rotation therewith; a plunger connected with said spring in such manner as to rotate with said spindle and axially movable in said housing with respect to said spindle and against the force of said spring; a hollow cylinder in and fixed to said housing beneath said plunger; a recording element rigidly connected to said plunger and extending into said cylinder; a tubular diaphragm of elastic material having an upper end fixed to the lower portion of said ring, a lower end fixed to the lower end of said carrier, and having an aperture in the proximity of said lower end thereof normally closed by said carrier, the portion of said diaphragm between said ring and the lower end of said carrier being spaced from the carrier and from said housing whereby said diaphragm and said carrier define therebetween a first chamber communicating with said orifice through channel means formed between said ring and said carrier, and said diaphragm and said housing define therebetween a second chamber normally sealed from said first chamber but adapted to communicate therewith through said aperture when the diaphragm expands in response to a predetermined pressure prevailing in said first chamber, the upper portion of said ring normally sealing said second chamber from said orifice; and a pressure transmitting fluid filling said second chamber and the housing between said carrier and said plunger, said gauge operating in such manner that a liquid passing through said orifice and filling said first chamber conveys its pressure through said diaphragm to the fluid in said second chamber and to said plunger to displace the latter against the force of said spring whereby said recording element records the liquid pressure on said cylinder, the upper portion of said ring constituting a valve and movable with said ring upwardly and out of sealing engagement with said housing to provide a passage between said orifice and said second chamber and to permit escape of said fluid through said orifice when the fluid exerts a predetermined pressure against the upper portion of said ring and causes the same to slide toward said orifice by expanding said diaphragm in the axial direction of said housing.

10. A gauge for measuring and recording the pressure of liquids in a drill bore comprising, in combination: an elongate housing of cylindrical contour having an axis, and a radial orifice; a carrier in said housing adjacent to said orifice, said carrier having a first end rigidly fixed to said housing, a second end, and an axial bore; a ring surrounding a portion of said carrier and slidably received in said housing for movements in the direction of said axis, said ring having a first portion adjacent to said orifice and a second portion of reduced diameter, said first portion normally sealingly engaging with said housing; a spindle extending through the bore of said carrier, said spindle having a first end and a second end; means connected to the first end of said spindle for rotating the same at a constant speed; a spring connected to the second end of said spindle for rotation therewith; a plunger connected with said spring in such manner as to rotate with said spindle and axially movable in said housing with respect to said spindle and against the force of said spring; a hollow cylinder in and fixed to said housing at a point spaced from said plunger; a recording element rigidly connected to said plunger and extending into said cylinder; a tubular diaphragm of elastic material having a first end fixed to the second portion of said ring, a second end fixed to the second end of said carrier, and having an aperture in the proximity of said second end thereof normally closed by said carrier, the portion of said diaphragm between said second portion of the ring and the second end of said carrier being spaced from the carrier and from the housing whereby said diaphragm and said carrier define therebetween a first chamber communicating with said orifice through channel means formed between said carrier and said ring, and said diaphragm and said housing define therebetween a second chamber normally sealed from said first chamber but adapted to communicate therewith through said aperture when the diaphragm expands in response to a predetermined pressure prevailing in said first chamber, the first portion of said ring normally sealing said second chamber from said orifice; and a pressure transmitting fluid filling said second chamber and the housing between said carrier and said plunger, said gauge operating in such manner that a liquid passing through said orifice and filling said first chamber conveys its pressure through said diaphragm to the fluid in said second chamber and to said plunger to displace the latter against the force of said spring whereby said recording element plots the liquid pressure on said cylinder, the first portion of said ring constituting a valve and movable with said ring upwardly and out of sealing engagement with said housing to provide a passage between said orifice and said second chamber and to permit escape of said fluid through said orifice when the fluid exerts a predetermined pressure against the first portion of said ring and causes the same to slide toward said orifice by expanding said diaphragm in the axial direction of said housing.

11. In a device for recording the pressure of liquid media, in combination: an elongate housing having an inlet orifice; a tubular diaphragm of elastic material installed in said housing and defining within itself a first enclosure in permanent communication with said orifice, said diaphragm and said housing defining between themselves a second enclosure normally sealed from said orifice and from said first enclosure; normally closed first one-way valve means for permitting overflow of a liquid medium from the first enclosure into said second enclosure in response to a predetermined difference between the pressures prevailing in said first and second enclosures and to resultant expansion of said diaphragm; normally closed second one-way valve means connected with said diaphragm for providing a communication between said second enclosure and said orifice upon axial expansion of said diaphragm in response to a predetermined pressure in said second enclosure; fluid means filling said second enclosure and adapted to convey pressures exerted by said diaphragm when a liquid medium fills said first enclosure; and pressure recording means responsive to the pressure of said fluid.

12. A device for recording the pressure of a liquid in a well comprising, in combination, an elongate tubular housing having inlet means and adapted to be inserted into the well so that liquid may enter from the well through said inlet means; a tubular diaphragm in said housing, said diaphragm defining within itself a first enclosure and being spaced from said housing so as to define with the latter a second enclosure normally sealed from said first enclosure, one of said enclosures in permanent communication with said inlet means so that the liquid contained in the well may enter said one enclosure to exert a pressure against the diaphragm in a direction to deform the same and to thereby reduce the volume of the other enclosure; a supply of fluid in said other enclosure for transmitting pressures exerted against the diaphragm by the liquid entering through said inlet means; means provided in said housing for recording the pressure of liquid in said one enclosure in response to the pressure transmitted by said fluid; normally closed first one-way valve means provided between said other enclosure and said inlet means for permitting the escape of fluid from said other enclosure in response to a predetermined fluid pressure in said other enclosure; and normally closed second one-way valve means provided between said enclosures for permitting the flow of liquid from said one enclosure to said other enclosure in response to a predetermined difference in pressures prevailing in said enclosures.

References Cited in the file of this patent
UNITED STATES PATENTS

| | | |
|---|---|---|
| 2,223,786 | Hugel | Dec. 3, 1940 |
| 2,259,867 | Webster | Oct. 21, 1941 |